C. SJOGREN.
VEHICLE WHEEL.
APPLICATION FILED SEPT. 7, 1915.
1,164,763.
Patented Dec. 21, 1915.
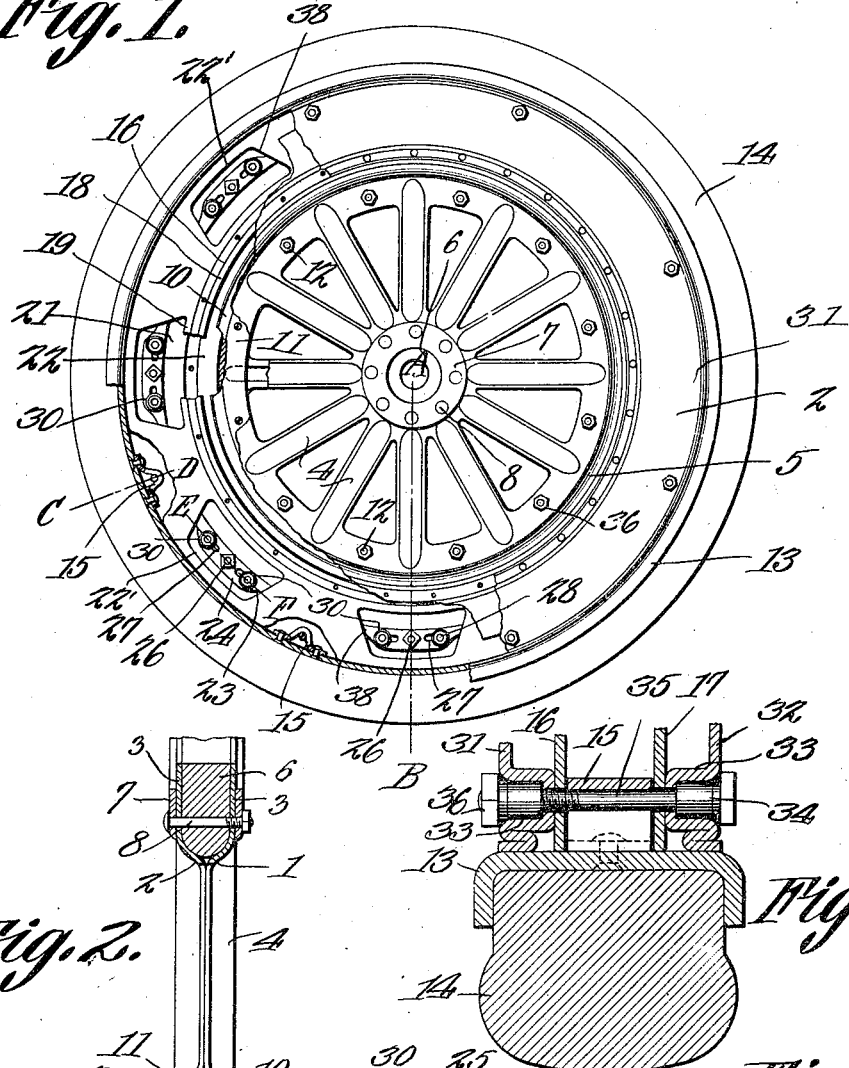
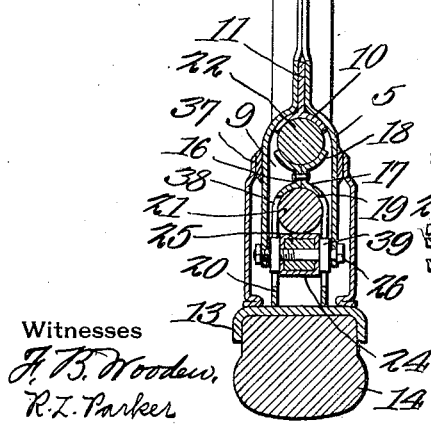
Witnesses
F. B. Wooden
R. L. Parker
Charl Sjogren Inventor,
by C. A. Snow & Co.
Attorneys.

UNITED STATES PATENT OFFICE.

CHARL SJÖGREN, OF WESSINGTON SPRINGS, SOUTH DAKOTA.

VEHICLE-WHEEL.

1,164,763.   Specification of Letters Patent.   Patented Dec. 21, 1915.

Application filed September 7, 1915. Serial No. 49,278.

*To all whom it may concern:*

Be it known that I, CHARL SJÖGREN, a citizen of the United States, residing at Wessington Springs, in the county of Jerauld and State of South Dakota, have invented a new and useful Vehicle-Wheel, of which the following is a specification.

This invention relates to vehicle wheels and is more especially designed as an improvement upon the structure disclosed in Patent No. 1,059,401, issued to me on April 22, 1913.

One of the objects of the invention is to provide a wheel the parts of which can be cheaply manufactured, readily assembled, and which will not become displaced relative to each other, the means employed for providing resiliency being fully protected at all times.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings: Figure 1 is a side elevation of a wheel embodying the present improvements, parts being broken away, and certain parts being shown in section. Fig. 2 is a section on line A—B Fig. 1, said section being on an enlarged scale. Fig. 3 is an enlarged section on line C—D Fig. 1.
Fig. 4 is an enlarged section on line E—F Fig. 1.

Referring to the figures by characters of reference 1 and 2 designate opposed plates which can be formed of sheet steel or the like and which are pressed and cut to form the wheel body made up of inner laterally offset rings 3, intermediate channeled portions 4 and outer annular rings 5 which are offset laterally. The inner rings 3 coöperate to house a hub ring 6 formed of fiber or any other suitable material, there being a reinforcing wear ring 7 upon the outer faces of the offset portions 3. The parts 3, 6 and 7 may be held together in any suitable manner, as by means of transverse bolts 8. The radially extending channel portions 4 co-operate with each other to form spokes, as shown particularly in Fig. 1, while the offset annular rings 5 coöperate to form an annular channel 9. Seated in the innermost portion of this channel 9 is a bearing ring 10 concavo-convex in cross section and having an inwardly extending flange 11 which is fitted between the inner portions of the rings 5. Flange 11 and the inner portions of the rings 5 may be held together in any manner desired, as by means of bolts 12 preferably located between the spokes as shown in Fig. 1. A channeled rim 13 is extended around and spaced from the offset rings 5 and is substantially concentric with these rings. Said rim 13 is provided with a tire 14 of any desired material. Secured to the inner face of the channeled rim at regular intervals are brackets 15 and arranged at opposite sides of the brackets are rings 16 and 17 preferably formed of sheet metal. The inner edges of these rings are offset as at 18 to form an annular seat concavo-convex in cross section and which is spaced from but disposed oppositely to the ring 10. The outer portions of the rings 16 and 17 are offset laterally as at 19 and then extended along parallel lines, thus to form a deep channel 20. The offset portions 5 of the disks 1 and 2 receive the rings 16 and 17 between them and fitted snugly within the channel 20 is a cushioning ring 21 preferably formed of rubber. Another cushioning ring 22 is fitted snugly upon the ring 10 and within the seat formed by the offset portions 18. The outer edges of the rings 16 and 17 fit snugly against the inner face of the rim 13 and are held against lateral displacement relative to the rim by the brackets 15. Those portions of the rings 16 and 17 forming the walls of channel 20 are provided at regular intervals with elongated openings 22' the end walls of which preferably diverge inwardly to form deflectors 23. The inner and outer walls of the openings are concentric with the rim 13.

Movably mounted in the channel 20 and bearing inwardly against the resilient ring 21 is a tubular ring 24. Said ring 24 is preferably rectangular in cross section and seated in those portions of the ring exposed through the openings 22' are cushioning blocks 25 of rubber or the like preferably held in place by bolts 26 extending transversely through the tubular ring. Each bolt is disposed between longitudinal slots 27 formed in the sides of the tubular ring and slidably mounted in these slots 27 are cross pins 28 extending through compressing blocks 29 slidably mounted in the ring 24. Pins 28 project into the openings 22' and mounted for rotation on the ends of these pins are rollers 30 which are supported freely in the openings 22'.

Fitted in the wheel at the outer sides of the rings 16 and 17 are guard rings 31 and 32 bearing snugly against the inner face of the rim 13. These guard rings have sockets 33 in their outer faces and close to rim 13, one of said sockets being adapted to receive the heads 34 of bolts 35, while the other socket is adapted to receive nuts 36 engaging the bolts. The bolts 35 extend transversely through the rings 16 and 17 and through the brackets 15 and thus serve to fasten together the rings 16, 17, 31 and 32 and to attach them to the rim 13 by engaging brackets 15. The inner edges of the rings 31 and 32 carry rings 37 of fiber or other suitable material slidably engaging the outer faces of the rings 16 and 17 and thus serving to prevent the admission of dust, moisture, etc., into the space between the guard rings 31 and 32.

As shown particularly in Fig. 1, those portions of the ring 24 located between the sets of blocks 25 and 29 may be cut away, as at 38. It will be noted that the bolts 26 which constitute connections between the cushioning blocks 25 and the ring 24 project into the offset portions 5 of the disks 1 and 2 so as thus to hold the ring 24 against rotation within the channel 9. These bolts 26 have spacing washers 39 mounted upon them between the sides of ring 24 and the sides of the channel 9, thus to prevent the rollers 30 from binding laterally against the ring 24 or the walls of channel 9.

It will be apparent that bolts 35 will hold the rings 16 and 17 against rotation relative to the rim 13 and, as bolts 26 are secured to the offset portions 5 and the disks 1 and 2 and extend through the ring 24, said ring 24 will be held against rotation independently of the disks 1 and 2. Ring 24 will be allowed a limited rotation relative to the rings 16 and 17 due to the size of the openings 22, but it will be obvious that when this limit of independent rotation is reached, one set of rollers 30 will strike against the adjacent inclined end walls of the openings 22 with the result that the blocks 29 to which said rollers are connected will be thrust longitudinally of the ring 24 and thus pressed against the cushioning block 25. The cushioning rings 21 and 22 obviously provide the desired resiliency in the wheel, the placing of a load upon the wheel resulting in a downward thrust through ring 10 upon the cushioning ring 22. Furthermore this downward thrust causes the upper portion of the tubular ring 24 to press downwardly on the upper portion of the cushioning ring 21.

The various parts of the wheel herein described can be readily disconnected for the purpose of repairing or replacing them.

What is claimed is:—

1. A resilient wheel including a wheel body having a peripheral channel, a rim movable relative to the body, concentric resilient rings in the channel, a non-resilient ring between said resilient rings and fixed to the rim, a non-resilient ring between and movable relative to the rim and the outer resilient ring, a connection between the body and the movable non-resilient ring, and cushioning means for retarding the rotation of the movable non-resilient ring relative to the rim.

2. A resilient wheel including opposed disks having offset outer portions forming an annular channel, a tire carrying rim extending therearound and shiftable radially relative thereto, a bearing ring within the said channel, connected rings fitted snugly against the rim of the wheel and extending inwardly therefrom, said rings being offset at their inner edges to form a seat and having their outer portions offset to form an annular channel, a non-resilient ring movably mounted within said channel, a resilient ring interposed between the inner portion of said channel and the non-resilient ring, a second resilient ring interposed between the offset inner edges of the connected rings and the bearing ring, connections between the non-resilient ring and disks, and cushioning means for retarding the rotation of the non-resilient ring relative to the rim.

3. A resilient wheel including connected disks having offset marginal portions forming an annular channel, a bearing ring seated in the inner portion of the channel, a tire carrying rim extending around and spaced from the disks, connected rings movable with the rim and within said channel, said rings having their inner edge portions offset to form a seat and having their outer portions offset to form an annular channel, a resilient ring interposed between said seat and the bearing ring, a resilient ring engaging the inner portion of the annular channel between the rings, a non-flexible tubular ring connected to the marginal portions of the disks and mounted to move radially and annularly within the channel between the connected rings, cushioning blocks fixedly secured within the tubular ring, compressing blocks slidably mounted within said ring and engaging the ends of the cushioning blocks, and means connected to the compressing blocks and coöperating with the rings for transmitting thrusts from said rings to the cushioning blocks.

4. A resilient wheel including connected disks having offset marginal portions forming an annular channel, a bearing ring seated in the inner portion of the channel, a tire carrying rim extending around and spaced from the disks, connected rings movable with the rim and within said channel, said rings having their inner edge portions offset to form a seat and having their outer portions offset to form an annular channel, a resilient ring interposed between said seat and the bearing ring, a resilient ring engaging the inner portion of the annular channel between the rings, a non-flexible tubular ring connected to the marginal portions of the disks and mounted to move radially and annularly within the channel between the connected rings, cushioning blocks fixedly secured within the tubular ring, compressing blocks slidably mounted within said ring and engaging the ends of the cushioning blocks, and means connected to the compressing blocks and coöperating with the rings for transmitting thrusts from said rings to the cushioning blocks, said means including rollers, connections between the rollers and the compressing blocks, there being openings in the rings into which the rollers project, the end walls of the openings diverging toward the center of the wheel.

5. A resilient wheel including opposed disks having offset marginal portions coöperating to form an annular channel and having offset radial portions coöperating to form spokes, a transversely bowed bearing ring interposed between the offset portions of the disks, a tire rim, inwardly extending rings movable with the rim and having an annular channel between their outer portions and a seat at their inner portions, the walls of said channel having openings therein the ends of which converge outwardly, a resilient ring interposed between the seat and the bearing ring, a resilient ring arranged within the annular channel between the rings, a non-flexible tubular ring within said channel and bearing against the last named resilient ring, connections between said tubular ring and the offset portions of the disks, cushioning means within the tubular ring, and means operated by the rotation of the tubular ring relative to the rim for compressing said cushioning elements.

6. A resilient wheel including opposed disks having offset marginal portions forming an annular channel, a cushioning ring seated in said channel, a rim, brackets extending inwardly from the rim, opposed rings having offset portions forming an annular channel into which the brackets extend, the inner ends of said rings bearing against the cushioning ring, guard rings extending inwardly from the rim and adjacent the sides of the disks, bolts extending through the guard rings, the offset rings and the brackets for holding them together, a non-flexible tubular ring movably mounted in the channel between the offset rings and connected to the offset portions of the disks, a resilient ring interposed between said tubular ring and the inner end of the channel between the offset rings, and coöperating means upon the offset rings and the tubular ring for resiliently limiting the relative rotation of said tubular ring and the rim.

7. A resilient wheel including opposed disks having offset marginal portions forming an annular channel, a cushioning ring seated in said channel, a rim, brackets extending inwardly from the rim, opposed rings having offset portions forming an annular channel into which the brackets extend, the inner ends of said rings bearing against the cushioning ring, guard rings extending inwardly from the rim and adjacent the sides of the disks, bolts extending through the guard rings, the offset rings and the brackets for holding them together, a non-flexible tubular ring movably mounted in the channel between the offset rings and connected to the offset portions of the disks, a resilient ring interposed between said tubular ring and the inner end of the channel between the offset rings, and coöperating means upon the offset rings and the tubular ring for resiliently limiting the relative rotation of said tubular ring and the rim, said means including cushioning blocks within the tubular ring, compressing blocks at the ends thereof and slidable in the ring, and rollers movable with the compressing blocks, said rollers projecting into openings in the sides of the channel formed between the offset rings, said openings having converging end walls for engagement with the rollers.

In testimony that I claim the foregoing as my own, I have hereto affixed my signature in the presence of two witnesses.

CHARL SJÖGREN.

Witnesses:
CHAS. R. HATCH,
MABEL SCHULTZ.